United States Patent
Schmid

(10) Patent No.: US 6,802,547 B2
(45) Date of Patent: Oct. 12, 2004

(54) BUMPER FOR VEHICLES, PARTICULARLY MOTOR VEHICLES

(75) Inventor: Markus Schmid, Moensheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/430,288

(22) Filed: May 7, 2003

(65) Prior Publication Data
US 2003/0214138 A1 Nov. 20, 2003

(30) Foreign Application Priority Data
May 14, 2002 (DE) .......................................... 102 21 294

(51) Int. Cl.$^7$ .............................................. B60R 19/08
(52) U.S. Cl. ........................ 293/120; 293/121; 293/142
(58) Field of Search ................................ 293/142, 145, 293/120, 121, 117

(56) References Cited

U.S. PATENT DOCUMENTS

| | | | | |
|---|---|---|---|---|
| 3,836,188 A | * | 9/1974 | Klees .......................... 293/120 |
| 3,869,165 A | * | 3/1975 | Miller ......................... 293/121 |
| 4,070,051 A | | 1/1978 | Peter |
| 4,213,644 A | * | 7/1980 | Scrivo et al. ................ 362/505 |
| 5,066,057 A | * | 11/1991 | Furuta et al. ................ 293/121 |
| 5,288,117 A | * | 2/1994 | Vogelgesang ................ 293/117 |
| 5,957,512 A | * | 9/1999 | Inada et al. .................. 293/102 |
| 6,419,289 B1 | * | 7/2002 | Batten et al. ................ 293/117 |
| 6,511,109 B1 | * | 1/2003 | Schultz et al. .............. 293/120 |
| 6,666,488 B2 | * | 12/2003 | Rinklin ....................... 293/120 |

FOREIGN PATENT DOCUMENTS

| | | |
|---|---|---|
| DE | 41 36 507 | 5/1992 |
| EP | 0548507 A1 | 6/1993 |
| JP | 08192699 A | 7/1996 |

OTHER PUBLICATIONS

European Search Report Mailed Jan. 2, 2004.

* cited by examiner

*Primary Examiner*—Stephen Gordon
(74) *Attorney, Agent, or Firm*—Crowell & Moring LLP

(57) ABSTRACT

A bumper for vehicles, particularly motor vehicles, includes a dimensionally stable member and an elastic covering forming an end region of the vehicle body. At least one light respectively is inserted into laterally exterior receiving pockets of the covering and is held in position at the covering. The light has a light-transmitting covering element on the side facing the end region. It is provided that, on each covering element, a guard is provided locally which projects slightly with respect to the adjacent elastic covering and is constructed in one piece with the covering element. In the area of the guard, in the event of a 30° pendulum crash, the covering element is supported on a member structure of the vehicle body situated behind the covering element.

20 Claims, 2 Drawing Sheets

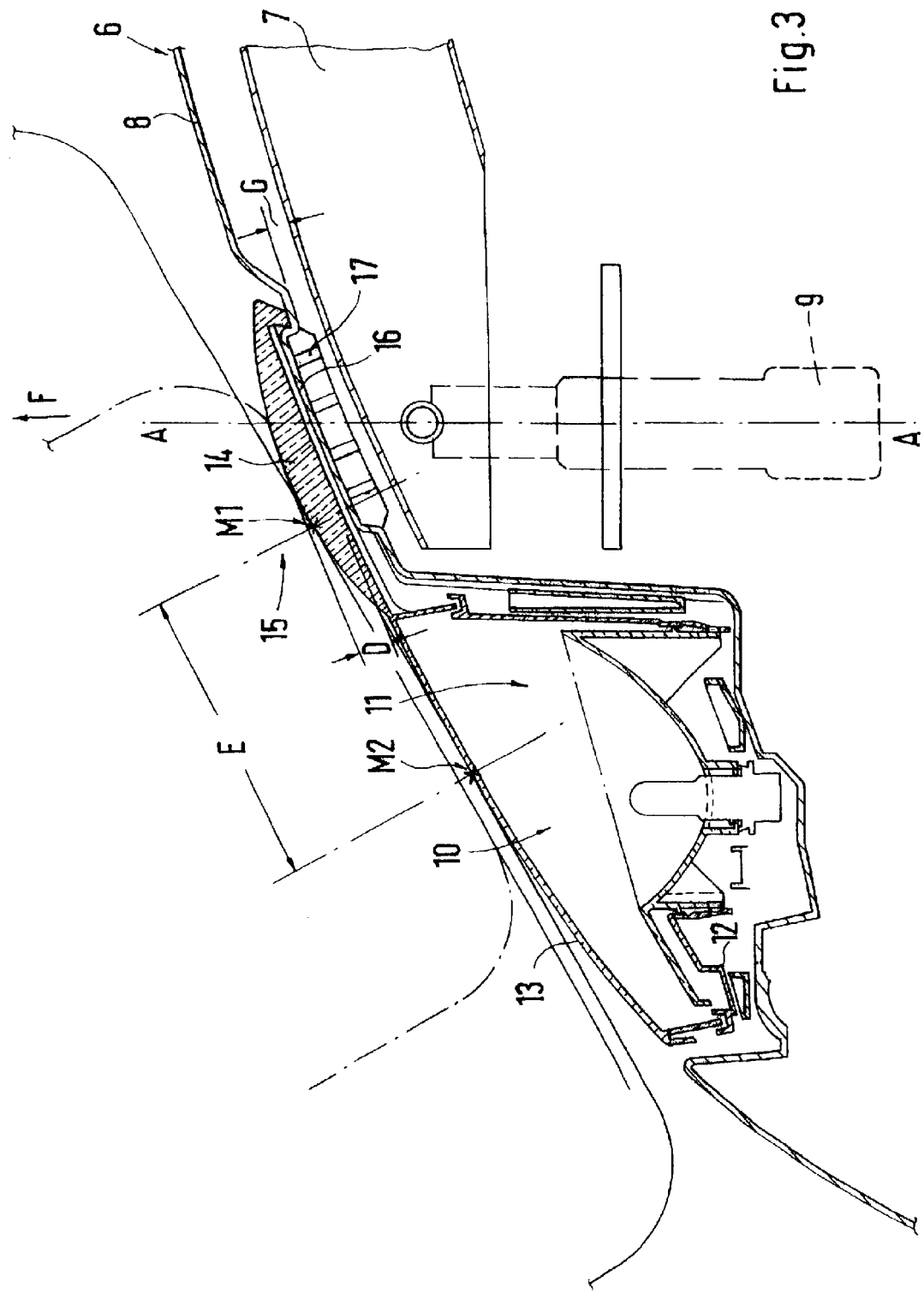

BUMPER FOR VEHICLES, PARTICULARLY MOTOR VEHICLES

BACKGROUND AND SUMMARY OF THE INVENTION

This application claims the priority of German Application No. 102 21 294.5 filed May 14, 2002, the disclosure of which is expressly incorporated by reference herein.

The invention relates to a bumper for vehicles, particularly motor vehicles, which comprises a dimensionally stable member and an elastic covering forming the end region of the vehicle body, at least one light respectively being inserted into laterally exterior receiving pockets of the covering and being held in position at the covering, and the light having a light-transmitting covering element on the side facing the end region.

In the case of bumpers with at least one light arranged within the covering, it is problematic that, in the event of a 30° pendulum crash, the light—particularly the light-transmitting covering element—should not be damaged. For meeting this requirement, it is known to arrange, next to the light, on the dimensionally stable member of the bumper, an impact guard made of rubber which protrudes through a recess of the covering and projects beyond the covering toward the front by a considerably extent.

It is an object of the invention to find a solution for meeting the legal requirements in the event of a 30° pendulum crash in which an impact guard arranged on the dimensionally stable member of the bumper can be eliminated.

This object is achieved according to certain preferred embodiments of the invention providing bumper for vehicles, particularly motor vehicles, which comprises a dimensionally stable member and an elastic covering forming an end region of the vehicle body, at least one light respectively being inserted into laterally exterior receiving pockets of the covering and being held in position at the covering, and the light having a light-transmitting covering element on the side facing the end region, wherein a guard is provided locally on each covering element and wherein in an area of the guard in the event of a 30° pendulum crash, the covering element is supported on a member structure of the vehicle body situated behind the covering element. Additional characteristics advantageously further developing the invention are described herein and in the claims.

Principal advantages achieved by means of the invention are that, as a result of the one-piece construction of a guard on the light-transmitting covering element, virtually an invisible guard is created by means of which the legal requirements are met in the event of a 30° pendulum crash. By arranging the guard on an interior edge area of the covering element, the theoretical impact point M1 of the 30° pendulum is displaced toward the interior, and a good introduction of force takes place into the carrying structure of the vehicle body. The covering element and the guard are preferably made of a shock-resistant plastic material, such as polycarbonate. In the event of an impact load upon the guard, the covering element is supported on a member structure of the vehicle body situated behind it.

Other objects, advantages and novel features of the present invention will become apparent from the following detailed description of the invention when considered in conjunction with the accompanying drawings.

BRIEF DESCRIPTION OF THE DRAWINGS

FIG. 3 is a horizontal sectional view taken along Section III—III of FIG. 2.

DETAILED DESCRIPTION OF THE DRAWINGS

Figure 1:
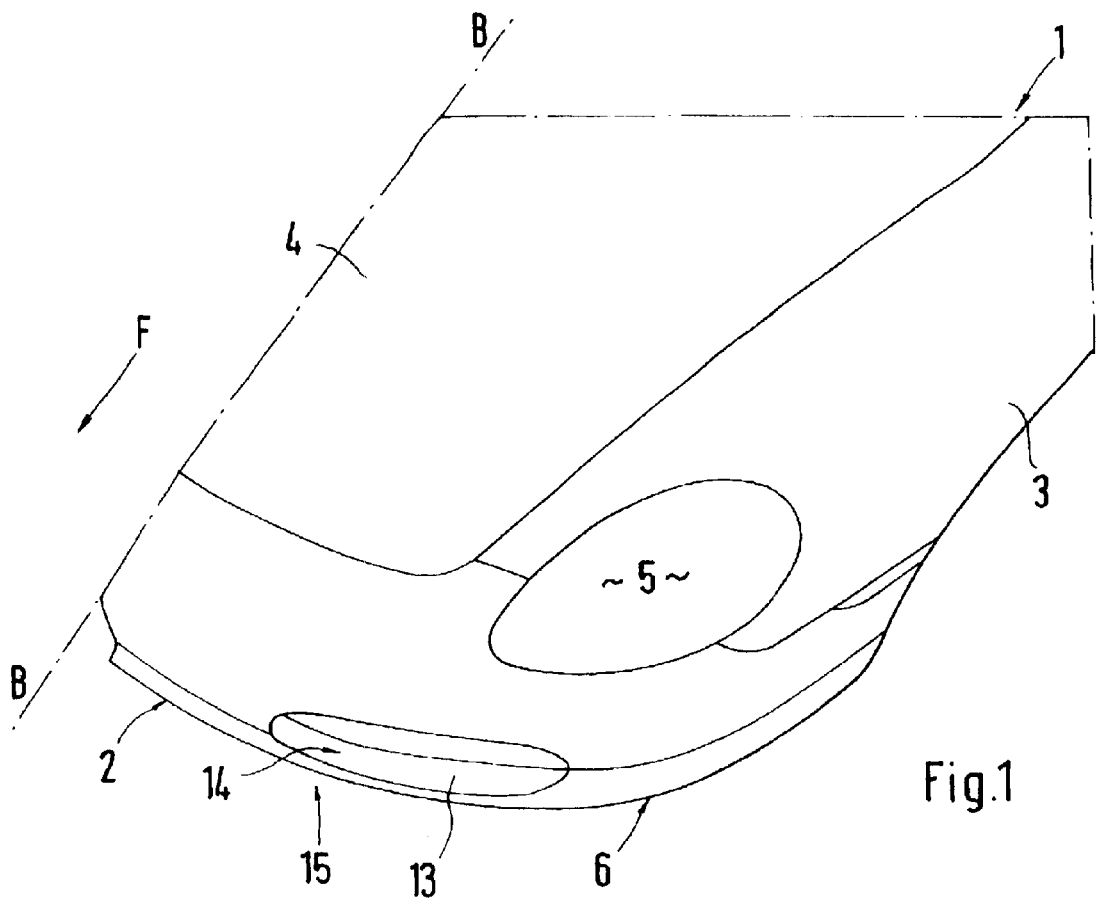
FIG. 1 is a perspective partial view diagonally from the front of the front end region of a vehicle as constructed according to a preferred embodiment of the invention.
Figure 2:
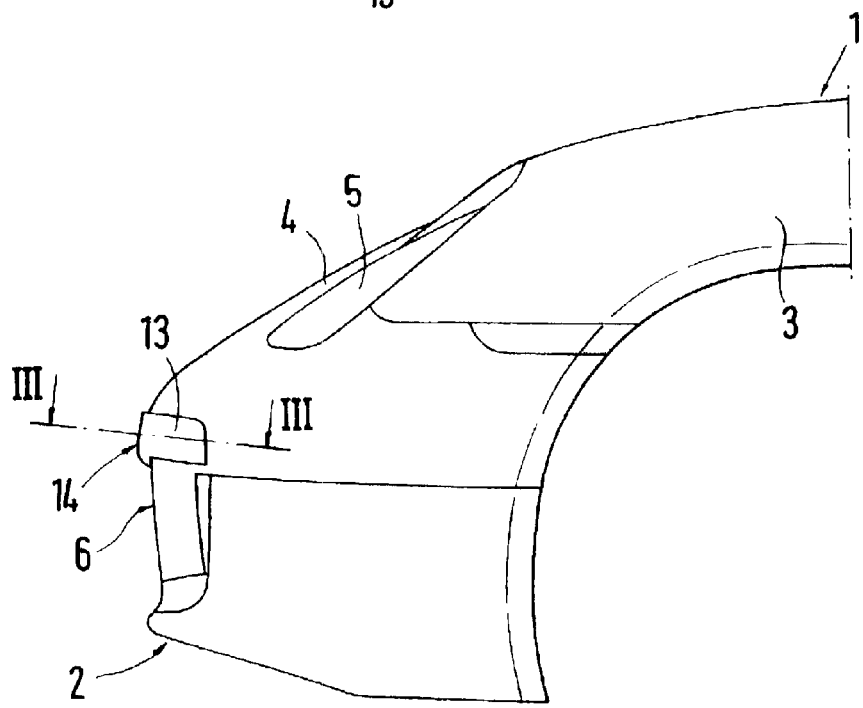
FIG. 2 is a partial lateral view of the front end region of the vehicle of FIG. 1.

In the illustrated front end region 2, a motor vehicle 1 comprises a side part 3, a hood 4, a headlight 5 and a bumper 6. The bumper 6 is composed of a transversely extending, dimensionally stable member 7 and of an elastic covering 8 forming the end region of the vehicle body. According to FIG. 3, the transversely extending member 7 is held in position on the vehicle body by means of hydraulic shock absorbers 9.

In the laterally exterior areas of the covering 8, recess-shaped receiving pockets 10 are provided which are open toward the front, at least one light 11 being inserted into each receiving pocket 10 and being held in position on the covering 8 by means of screws, clips, or the like.

Each light 11 comprises a housing 12 and, on the side facing the end region, a light-transmitting covering element 13. The covering element 13 is connected with the housing 12 by way of a permanently elastic bonding agent which is not shown in detail.

Each light 11 comprises a turn signal and/or a fog light and/or a position light or the like. In the embodiment shown, each light 11 extends on both sides of a center line A—A of the shock absorber 9 extending in the longitudinal direction of the vehicle.

According to the invention, a guard 14, which—in the top view—protrudes slightly with respect to the contour of the adjoining covering 8 and which is constructed in one piece with the covering element 13, is provided on each covering element 13. In the event of a shock load upon the bumper 6, the covering element 13 is supported in the area of the guard on a member structure (dimensionally stable member) of the vehicle body located behind it. The light-transmitting covering element 13 and the guard 14 are produced of a shock-resistant plastic material, such as polycarbonate or the like. In order to achieve a good introduction of force into the vehicle body, the guard 14 is arranged on an edge area 15 of the covering element 13 (FIG. 3) facing a longitudinal center plane B—B of the vehicle. The guard 14, which has a narrow thickness D, viewed in the driving direction F, has a convex shape. By positioning the guard 14 on the edge area 15 of the covering element 13, a theoretical impact point M1 is displaced by the extent E toward the inside in comparison to an arrangement without a guard. By means of solid lines, FIG. 3 shows the pendulum during the impact upon the vehicle, the point M1 representing the theoretical impact point at the vehicle body.

In the case of an arrangement without a guard, the position of the pendulum is illustrated by dash-dotted lines with the theoretical impact point M2 which is situated farther on the outside than the impact point M1.

In the area of the projecting guard 14, the covering element 13 rests by means of its back side 16 on the housing 12 or on a wall of the receiving pocket 10 of the covering 8. In the event of a 30° pendulum crash, the covering 8 is moved by a short path (gap G) toward the rear and is then directly supported on the dimensionally stable member 7 (not shown in detail).

The guard 14 extends along the entire height of the covering element 13, the guard 14—in a vertical sectional view—being constructed in a straight line or in a curved manner. By means of the integration of the guard 14 into the covering element 13, virtually an invisible guard 14 is created. In the area of the guard 14, the covering 8 is provided with a ribbing 17 on the side facing the member 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Bumper for vehicles which comprises a dimensionally stable member and an elastic covering forming an end region of the vehicle body, at least one light respectively being inserted into laterally exterior receiving pockets of the covering and being held in position at the covering, and the light having a light-transmitting covering element on a side facing the end region, wherein a guard is provided locally on each covering element which projects slightly with respect to an adjacent elastic covering and is constructed in one piece with the covering element, and wherein an area of the guard, in the event of a 30° pendulum crash, the covering element is supported on a member structure of the vehicle body situated behind the covering element.

2. Bumper according to claim 1, wherein the light-transmitting covering element and the guard are made of a shock-resistant plastic material.

3. Bumper according to claim 2, wherein the light-transmitting covering element and the guard are made of a shock-resistant polycarbonate material.

4. Bumper according to claim 1, wherein the guard is arranged on an edge area of the covering element facing a longitudinal center plane of the vehicle.

5. Bumper according to claim 2, wherein the guard is arranged on an edge area of the covering element facing a longitudinal center plane of the vehicle.

6. Bumper according to claim 3, wherein the guard is arranged on an edge area of the covering element facing a longitudinal center plane of the vehicle.

7. Bumper according to claim 3, wherein, viewed in a driving direction, the guard has a convex shape.

8. Bumper according to claim 2, wherein, viewed in a driving direction, the guard has a convex shape.

9. Bumper according to claim 3, wherein, viewed in a driving direction, the guard has a convex shape.

10. Bumper according to claim 4, wherein, viewed in a driving direction, the guard has a convex shape.

11. Bumper according to claim 5, wherein, viewed in a driving direction, the guard has a convex shape.

12. Bumper according to claim 6, wherein, viewed in a driving direction, the guard has a convex shape.

13. Bumper according to claim 1, wherein, as a result of arrangement of the guard on an interior edge area of the covering element, a theoretical impact point of a 30° pendulum is displaced toward an interior in the direction of a longitudinal center plane of the vehicle.

14. Bumper according to claim 2, wherein, as a result of arrangement of the guard on an interior edge area of the covering element, a theoretical impact point of a 30° pendulum is displaced toward an interior in the direction of a longitudinal center plane of the vehicle.

15. Bumper according to claim 3, wherein, as a result of arrangement of the guard on an interior edge area of the covering element, theoretical impact point of a 30° pendulum is displaced toward an interior in the direction of a longitudinal center plane of the vehicle.

16. Bumper according to claim 4, wherein, as a result of arrangement of the guard on an interior edge area of the covering element, a theoretical impact point of a 30° pendulum is displaced toward an interior in the direction of the longitudinal center plane of the vehicle.

17. Bumper according to claim 5, wherein, as a result of arrangement of the guard on an interior edge area of the covering element, a theoretical impact point of a 30° pendulum is displaced toward an interior in the direction of the longitudinal center plane of the vehicle.

18. Bumper according to claim 6, wherein, as a result of arrangement of the guard on an interior edge area of the covering element, a theoretical impact point of a 30° pendulum is displaced toward an interior in the direction of the longitudinal center plane of the vehicle.

19. Bumper according to claim 7, wherein, as a result of arrangement of the guard on an interior edge area of the covering element, a theoretical impact point of a 30° pendulum is displaced toward an interior in the direction of a longitudinal center plane of the vehicle.

20. A motor vehicle comprising a vehicle body having a cross body member and a bumper which comprises a dimensionally stable member and an elastic covering forming an end region of the vehicle body, at least one light respectively being inserted into laterally exterior receiving pockets of the covering and being held in position at the covering, and the light having a light-transmitting covering element on a side facing the end region, wherein a guard is provided locally on each covering element which projects slightly with respect to an adjacent elastic covering and is constructed in one piece with the covering element, and wherein an area of the guard, in the event of a 30° pendulum crash, the covering element is supported on the cross body member situated behind the covering element.

* * * * *